May 12, 1942.                C. W. OLIPHANT                2,283,086
METHOD AND APPARATUS FOR ANALYSIS
Filed March 26, 1940            2 Sheets-Sheet 1
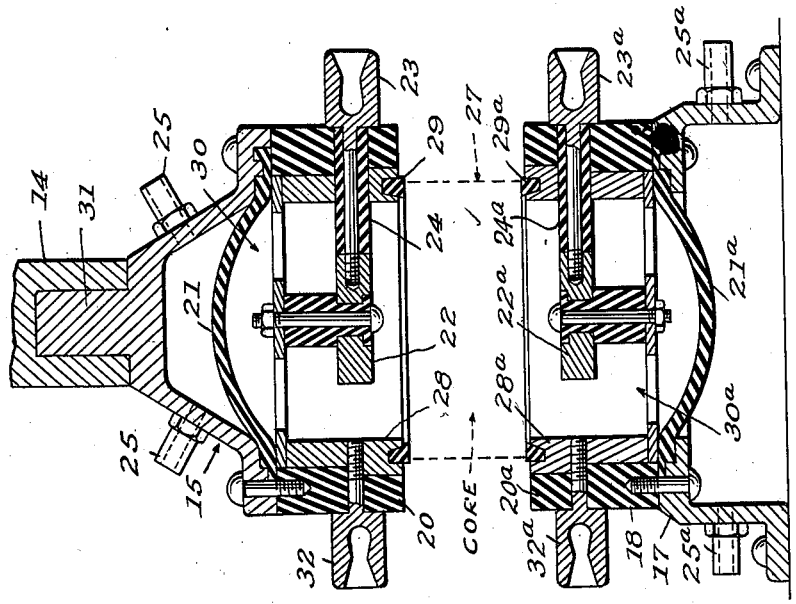
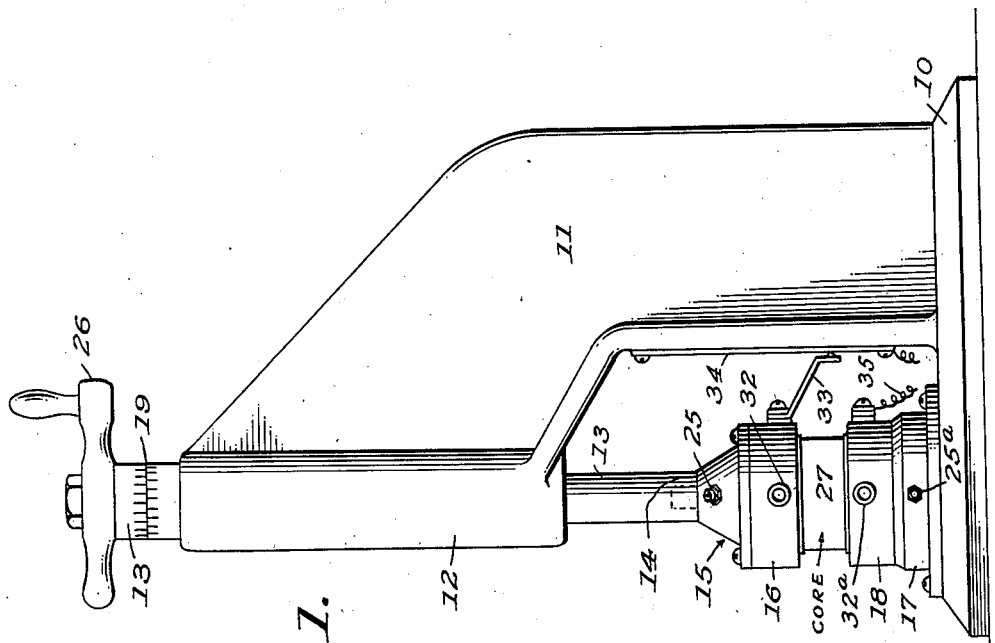
Inventor
CHARLES W. OLIPHANT
By Edward B. Beale
Attorney

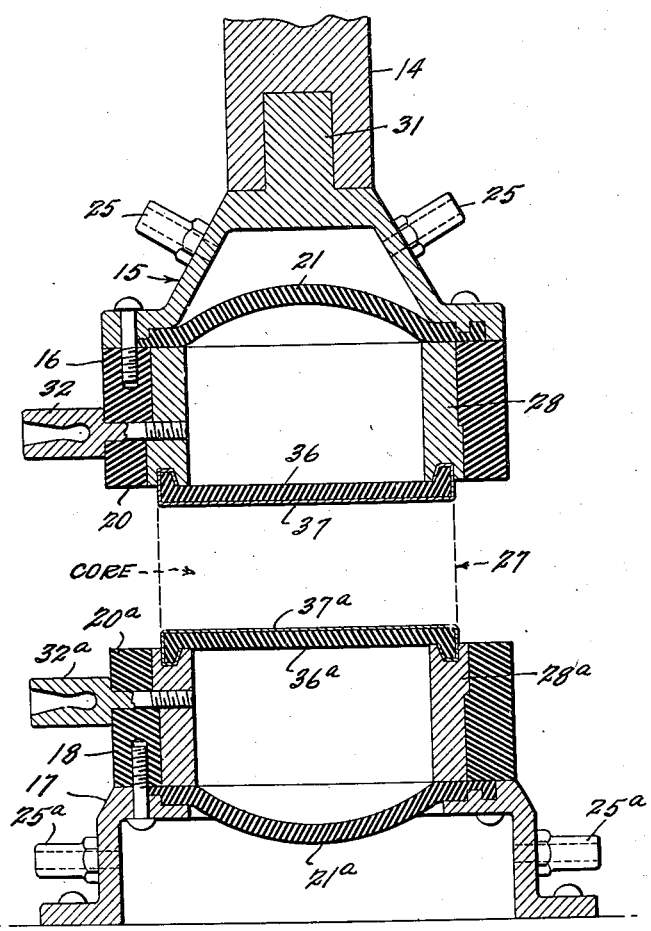

Patented May 12, 1942

2,283,086

UNITED STATES PATENT OFFICE 2,283,086

METHOD AND APPARATUS FOR ANALYSIS

Charles W. Oliphant, Tulsa, Okla.

Application March 26, 1940, Serial No. 326,102

7 Claims. (Cl. 175—183)

The present invention relates to the determination of the water and hydrocarbon content and certain of the physical properties of oil well test cores. More specifically, the invention contemplates an apparatus whereby determination of percentages of water and hydrocarbon, the porosity and the permeability of the core, and the fluid or production index based upon the data computed from the measurements of the dielectric constants obtained with the apparatus. Fluid index is a qualitative expression which denotes to the operator whether the formation under test is capable of producing oil or gas or water or mixtures thereof. The index relates directly the percent water saturation and the percent hydrocarbon saturation and indirectly the percent porosity and the permeability of the formation from which the sample is taken. It may be expressed by the following formula $$F.I. = \frac{V_o}{V_w}(V_o + V_w)$$

where $V_o = \%$ oil saturation in the core
$V_w = \%$ water saturation in the core The prior art analysis of core samples has been limited to the separation and identification of the constituents which are entrained, occluded, and absorbed by the rock or sand particles of the core. These constituents have been removed from the sample by solvent extraction or distillation with the consequent introduction of many indeterminate variables which serve to make accurate determinations difficult if not impossible of attainment.

It is therefore an object of this invention to provide an apparatus to enable the requisite measurements and determinations to be effected in a more expeditious and accurate manner than has been possible heretofore.

A typical core sample is a heterogenous system composed of rock grains and water, and in which hydrocarbons may also be found. When placed in an electrical field, such a system may be analyzed to give indications of the number of molecules of water as well as hydrocarbons within the core. These indications are in the form of dielectric constants which I utilized to effect a quantitative and a qualitative analysis of the core.

The specific inductive capacity or the "dielectric constant" of the core is a function of the water and hydrocarbon content, the porosity and permeability of the formation and the dielectric constant of the rock. The capacity changes are of such magnitude as to be measurable by simple capacity bridges which may be calibrated directly in terms of the characteristics. The inherent accuracy of electrical measurement as compared to other physical and chemical analytical methods render my method highly desirable for the computation of the fluid or production index.

Two conductors separated by a dielectric constitute a condenser. When a potential difference is applied between the plates of the condenser, electricity is stored in the condenser, a positive charge being on one plate and an equal negative charge being on the other plate. This property of a condenser to store electricity is called capacitance. The unit of capacitance is the farad which may be expressed in terms of E volts and Q ampere-seconds as follows: $C=Q/E$. The farad is too large a unit for practical purposes and the microfarad (mf. equal to one millionth of a farad) is a unit of capacitance ordinarily used. In apparatus such as used in this invention where the capacitances are very small, the micromicrofarad (mmf. equals $10^{-12}$ farad) is used.

The dependence upon physical dimensions of the condenser can then be eliminated by using the dielectric constant, defined as $\epsilon = C/C_h$, where C is the capacity of the condenser when the dielectric material is between its plates and $C_h$ is the capacity of the same arrangement of plates in a vacuum, or for practical purposes, in air. The dielectric constant is then a property of the dielectric material itself.

In any core it is assumed that there is a heterogeneous system composed of sand grains, water, and possibly oil and/or gas which will give rise to interfacial polarization when placed in an alternating field. By observing the anomalous dispersion occurring in some given band of frequencies, it is possible to effect a quantitative and qualitative analysis of this core for water and oil.

It is an accepted fact that interfacial polarizations must exist in any dielectric made up of two or more components having different dielectric constants and conductivities except for the particular case where $\epsilon_1\gamma_2=\epsilon_2\gamma_1$, $\gamma$ representing the total A. C. conductivity, a quantity which depends on the frequency; the subscript refers to the two components.

The table shown below lists the dielectric constants and conductivities of the constituents of the heterogeneous system.

Table

| | $\epsilon$ | $\gamma$ |
|---|---|---|
| Oil-petroleum | 2.13 | Very low. |
| Sand grains: | | |
| Quartz | 5.06 | |
| Mica | 5.66 | Greater than that of oil but less than that of salt solution. |
| Calspar | 8.49 | |
| Marble | 8.30 | |
| Water | 81.07 | Very high—ionic solutions. |

Therefore it will be obvious that $\epsilon_1\gamma_2 \neq \epsilon_2\gamma_1$ and hence interfacial polarization must exist.

The magnitude and time of relaxation of interfacial polarization are determined by the difference in $\epsilon$ and $\gamma$ of the two components. There is a widely prevalent opinion that this type of polarization always has such long relaxation times as to be observed only at very low frequencies. While this is true for mixtures of very low conductivity components, the general equations show that for the case where one component has a high conductivity—for example, equal to that of a salt solution—the dispersion may occur in the radio frequency range.

Under this hypothesis, the dielectric constant would be expected to decrease as the frequency increased since in any composite, two layer dielectric the capacity of the system is dependent upon the charging time. For when a charge is accumulating at the interface between the two layers, this charge must flow through one dielectric layer whose resistance may be high enough that the interface does not become completely charged during the time allowed for charging.

For the alternating current case this implies a decrease of capacity with increasing frequency which is equivalent to anomalous dispersion, the decrease in dielectric constant with increasing frequency.

Thus it would be expected that the dielectric constant of the mixture would vary with frequency in the way shown in the following graph:

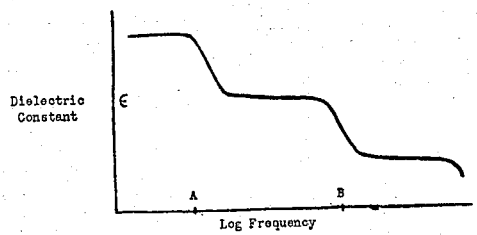

The dispersion points A and B on the frequency ordinate indicate the points where a given constituent no longer contributes to the total dielectric constant of the heterogeneous medium. Thus as the frequency is increased all the dispersion points should be passed through, and hence the contribution of each constituent of the dielectric to the total dielectric can be separated. The constituent itself may be identified by the point on the frequency ordinate at which it is responsible for the occurrence of dispersion. The amount of change in the dielectric constant is a function of the amount of the constituent present.

The capacity of an electrical condenser is proportional to the dielectric constant of the core between the plates of the condenser, other things being equal, and the dielectric constant of the core may be defined as the ratio of the capacity of the condenser with the core as the dielectric, to the capacity of the condenser with dry air as the dielectric. By driving off the volatile matter contained within the core (and observing the change in capacity of a condenser in which the dry core serves as the dielectric) and comparing with other readings, the precentages of water and hydrocarbon present in the virgin core and the total porosity of the core may be computed by formulae derived below. The apparatus of this invention therefore determines the values of the dielectric constant of the dry core, of the water and/or hydrocarbon saturated core, and of the rock per se of the core which may be employed to compute the fluid or production index.

The apparatus hereinafter described makes use of the change in dielectric properties of the core in accordance with variations in the percentages of water and hydrocarbons present and the relative porosity and permeability of the core; that is to say, the determinations are based upon differences in the dielectric constants or specific inductive capacities.

One form of apparatus suitable for carrying out the invention comprises various elements in an electrical circuit adapted to subject the core sample to a variable frequency current and to indicate electrical properties of the core which may be translated by suitable equations into terms of fluid index. In a preferred embodiment the elements of the complete apparatus include a variable frequency oscillator and amplifier, a capacity bridge, a resistance meter, a standard variable condenser, and the core test condenser which is a particular feature of this invention. Further details of capacity measurement are adequately covered in the literature. When the values for the capacity of the core are substituted in the equations derived below, the structural characteristics and the water and hydrocarbon saturation of the core sample may be computed.

A particular object of this invention is to provide a new and novel test condenser adapted to determine accurately the dielectric constant of the core. A further object of the invention is to provide a test condenser having plates which are adapted to conform to the surface of the core under test. One form of such condenser utilizing a fusible metal is shown in the drawings and will be described in detail. Another form of the core condenser contemplated by this invention comprises soft rubber blocks with a replaceable soft metal foil on the face of each rubber block. These metal foils serve as the plates of the condenser and are connected to the test circuit. When the core is placed between the foil-faced rubber blocks and pressure is applied, the metal foil is forced into the irregular surface of the core.

In order that the apparatus for accomplishing the above objects may be more clearly understood, reference may be made to the following description and accompanying drawing wherein:

Figure 1 is an elevational view of the core test condenser and frame.

Figure 2 is a view in section showing in detail parts of the apparatus illustrated in Figure 1.

Figure 3 is a view generally similar to Figure 2 illustrating a modified type of construction.

The test condenser shown in Figures 1 and 2 comprises generally a base 10 of any suitable construction and a standard or support 11 extending from the base. The upper end of the standard or support 11 is provided with a screw threaded bearing 12 for an adjusting or compression rod 13. The rod 13, movable within and extending above and below the bearing 12, terminates on its lower end with a hollow head 14 adapted to engage member 15 which is attached to one of the condenser plate units designated generally by the numeral 16 in Figure 1 and shown more in detail in Figure 2. Upon the base 10, there is mounted a support 17 adjacent to the standard or bracket 11. This member 17 supports a plate unit 18 corresponding to unit 16. On the rod 13 above the bearing 12 is fixed a vernier scale 19. On the upper end of the rod 13 is provided handle 26 for adjusting the distance between the condenser plate supports.

The condenser plate units 16 and 18 include insulating rings 20 and 20a, conducting rings 28 and 28a, elastic membranes 21 and 21a, electrodes 22 and 22a communicating with jacks 23 and 23a and insulated from conducting rings 28 and 28a by insulation 24 and 24a, and jacks 32 and 32a mounted in a manner similar to jacks 23 and 23a. The plate supports 15 and 17 enclose the elastic diaphragms 21 and 21a to form cooling jackets and include cooling fluid connections 25 and 25a.

Compression rod 13 is provided with a handle 26 to facilitate the adjustment of the condenser plates to accommodate the core sample 27. The elastic diaphragms 21 and 21a preferably are made of rubber and may be secured at their peripheries by clamping between the conducting rings 28 and 28a and the cooling jacket-plate support members 15 and 17 respectively. The exposed edges of the rings 28 and 28a are provided with rubber gaskets 29 and 29a and are adapted to engage opposite surfaces of the core sample.

In addition to the mechanical parts, the condenser plates 16 and 18 include two masses of Wood's metal 30 and 30a or other material having similar properties, i. e. electrically conductive and heat fusible with a short range of temperature between the solid and fluid forms.

The electrodes 22 and 22a are provided to effect the fusing of the conducting material 30 and 30a. After the core sample has been placed between the condenser plates and the ends sealed off by washers 29 and 29a, a current is passed across each unit, i. e. from jack 23 to 32 and from 23a to 32a. The heating circuit includes a high current source which may be obtained, for example, by a transformer from 100 volt A. C. Obviously, the current may be applied to jacks 23 and 32 and complete the circuit by connecting jacks 23a and 32a.

Figure 1 shows means for electrical connection to the two plates. Sliding electrical contact 33 attached to movable condenser plate 16 maintains contact with metal contacting bar 34 carried by and insulated from frame 11. The wire 35 in turn is connected to the fixed lower condenser plate 18. Connections to the capacity bridge are made through wire 35 and contact bar 34.

When heated, the masses of conducting material 30 and 30a become fluid and the fluid metal is forced over the core surface by elastic diaphragms 21 and 21a, the fluid material being retained by washers 29 and 29a. The heating current is then removed and the fused material is permitted to cool. To hasten the solidification, cooling jackets 15 and 17, having cooling fluid circulating connections 25 and 25a, may be provided.

In the embodiment shown in the drawing, the movable condenser plate 16 is readily removed from the hollow head 14. It is contemplated that the lower condenser plate unit 18 also may be made readily replaceable. For example, this may be accomplished by constructing the support 17 in a manner similar to the member 15 in the upper plate and providing a recess in the base 10 for the projection 31.

In making a complete core analysis in accordance with my method and apparatus, a section of the fresh core about one centimeter in length may be cut at right angles to the axis of the core and placed between the plate of the test condenser. The movable support 16 is forced down on the surface of the core by turning the compression screw 13, the rubber washers 29 and 29a, sealing off a given area of the core ends. The reading of the scale 19 is recorded. Current is applied to the jacks causing a heating current to pass through the conducting rings 28 and 28a, the masses 30 and 30a of fusible Wood's metal, and the electrodes 22 and 22a. The fused material flows onto the surface of the core ends and each pool of liquid metal is urged toward the core face by means of the rubber diaphragms 21 and 21a with the result that the metal conforms to the irregular surface of the core. The passage of heating current is terminated by withdrawing plugs from jacks and the fusible material permitted to solidify while being held in place by the rubber diaphragms 21 and 21a. Water jackets 15 and 17 may be used to decrease the time necessary for solidifying the Wood's metal. By this means, a pair of condenser plates is formed that conforms exactly to the surfaces of the core faces and the pressure of the plates against the core will always be constant. This is highly desirable in obtaining accurate results.

Referring to Figure 3, it will be observed that I have shown a type of core condenser which is generally similar to that shown and described in connection with Figures 1 and 2, wherein each conducting ring 28 and 28a is provided with an annular groove into which is detachably fitted a rubber block 36, 36a. The exposed face of each rubber block supports a replaceable soft metal foil 37, 37a.

In this embodiment it can be seen that I omit the Wood's metal which is adapted to be heated and hence it is only necessary to provide a single jack for each of the units 16 and 17 which is identified by the numerals 32 and 32a, respectively, since it is only necessary to have an electrical connection from the jack to the metal foil on the rubber block.

In operation the core sample is disposed between the opposing faces of the condenser plate units and the movable support 15 is forced downwardly on the surface of the core by the proper manipulation of the screw 13. A fluid under pressure is introduced into the supports 15 and 17 through the connections 25 and 25a. This fluid flows through the passage formed by the support 15 and the membrane 21. Of course, the pressure of the fluid is transmitted to the rubber blocks and this forces the soft metal foils 37 and 37a into the faces of the core sample.

While I have illustrated certain specific constructions and certain preferred methods of operation by way of example, I do not wish to be limited thereto as changes may be made without departing from the spirit of my invention.

Furthermore, it is contemplated that other means may be used to achieve the desirable condenser plate structure wherein the plate conforms to the surface of the test core. Rubber blocks faced with conducting metal foils are suggested above and the substitution of operative equivalents of the rubber blocks, for example, synthetic rubber, balata, foamed latex, etc., is contemplated. Likewise, other fusible conducting materials, such as any of the alloys having the requisite properties, may be substituted for the Wood's metal. Other forms of yielding conducting condenser plate faces are contemplated, for example, malleable or semi-plastic conducting plate surfaces, which are pressed onto the core section, may be used.

What I claim is:

1. A device for determining the dielectric properties of irregularly shaped bodies, comprising a base and a frame support, a first condenser plate support mounted on said base, a second and adjustable plate support movable relative to the first support and mounted on said frame, a condenser plate unit including a mass of fusible conducting material insulated from and carried by each of said plate supports, variable volume means for holding said fusible material, means for fusing the conducting material, said variable volume holding means being adapted to urge the fused material toward the surface of the body, and means for retaining the fused material in conducting relation with the entire surface in contact with the condenser plate.

2. In a device for determining the dielectric properties of a core sample, comprising a base and a frame support, a first condenser plate support mounted on said base, a second and adjustable plate support mounted on said frame and movable relative to the first support, a condenser plate unit comprising a mass of fusible material held by an elastic membrane and an annular shell insulated from and carried by each of said plate supports, electrical means to fuse the mass of fusible conducting material, said elastic membrane being adapted to urge the molten metal toward the exposed core surface, and means for retaining the molten metal in conducting relation with the core face and the condenser plate unit.

3. An apparatus for determining the capacitance of irregularly shaped bodies including a base and frame member, relatively movable condenser plate supports, and condenser plate units operably associated with said supports, said condenser plate units comprising variable volume means, resilient members in pressure transmitting contact with said variable volume means, said resilient members being provided with thin surfaces of a conductive metal, the metal surfaces of said resilient members being conformable to the irregularly shaped body in response to the pressure of the variable volume means.

4. An apparatus for determining the capacitance of irregularly shaped bodies including a base and frame member, relatively movable condenser plate supports, and condenser plate units operably associated with said supports, said condenser plate units comprising variable volume means, rubber-like members in pressure transmitting contact with said variable volume means and a replaceable soft conductive metal foil secured to said members, the metal foil secured to said members being conformable to the irregularly shaped body in response to the pressure of the variable volume means.

5. A device for determining the dielectric properties of irregularly shaped bodies, comprising a base and a frame support, a first condenser plate support mounted on said base, a second and adjustable plate support movable relative to the first support and mounted on said frame, a condenser plate unit including a resilient member provided with a thin surface of a conductive metal, said member being insulated from and carried by each of said plate supports, means to hold said resilient members and urge the metal surfaces thereon toward the irregular body and means for retaining the conductive metal surfaces of said resilient members in conducting relation with the entire surface in contact with said condenser plates.

6. A device for determining the dielectric properties of irregularly shaped bodies, comprising a base and a frame support, a first condenser plate support mounted on said base, a second and adjustable plate support movable relative to the first support and mounted on said frame, a condenser plate unit including a rubber-like member, a replaceable soft conductive metal foil secured to said member, said member being carried by each of said plate supports, an insulating material positioned between said conductive metal foil and said plate supports, means to hold said rubber-like members and urge the conductive metal foil secured thereto toward the irregular body and means for retaining the conductive metal foil on said rubber-like member in conducting relation with the entire surface in contact with said condenser plates.

7. An apparatus for determining the capacitance of irregularly shaped bodies comprising a base and a frame support, a condenser plate unit support mounted on said base, an adjustable condenser plate unit support movable relative to said base support and mounted on said frame, a condenser plate unit carried by each of said supports, each condenser plate unit including a confined elastic mass, a variable volume means in pressure transmitting contact with an area of said elastic mass, and a plastic metal condenser plate surface in contact with another area of said elastic mass, said variable volume means being adapted to transmit pressure uniformly throughout said elastic mass and force the plastic metal condenser plate surface into contact with each contour of the irregularly shaped body being tested.

CHARLES W. OLIPHANT.